(12) United States Patent
Chikuan et al.

(10) Patent No.: US 6,494,099 B1
(45) Date of Patent: Dec. 17, 2002

(54) PRESSURE DETECTION APPARATUS HAVING FIRST AND SECOND CASES DEFINING PRESSURE DETECTION CHAMBER THERE BETWEEN AND METHOD OF MANUFACTURING THE SAME

(75) Inventors: Kenji Chikuan, Kariya (JP); Kazuhiko Koga, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/603,956

(22) Filed: Jun. 26, 2000

(30) Foreign Application Priority Data

Jul. 16, 1999 (JP) .............................. 11-203568

(51) Int. Cl.$^7$ ................................................ G01L 7/00
(52) U.S. Cl. ................................................. 73/706
(58) Field of Search .................. 73/706, 756; 29/25.01, 29/25.02, 25.03, 25.35, 25.42

(56) References Cited

U.S. PATENT DOCUMENTS

| 4,903,164 A | 2/1990 | Bishop et al. ............. 25/25.42 |
| 5,595,939 A | 1/1997 | Otake et al. |
| 5,932,808 A | 8/1999 | Hayashi et al. ................ 73/724 |

*Primary Examiner*—William Oen
(74) *Attorney, Agent, or Firm*—Law Offices of David G. Posz

(57) ABSTRACT

A pressure detection apparatus is manufactured by fitting an end portion of a first case into an opening portion of a second case, filling a space, which is defined between the end portion of the first case and an opening edge portion of the second case, with adhesive, and hardening the adhesive. Accordingly, variations in volume of a pressure detection chamber sealed between the first case and the second case can be reduced, resulting in decreased variations in output.

16 Claims, 9 Drawing Sheets

PRESSURE DETECTION APPARATUS HAVING FIRST AND SECOND CASES DEFINING PRESSURE DETECTION CHAMBER THERE BETWEEN AND METHOD OF MANUFACTURING THE SAME

CROSS REFERENCE TO RELATED APPLICATION

This application is based upon and claims the benefit of Japanese Patent Application No. 11-203568 filed on Jul. 16, 1999, the contents of which are incorporated herein by reference.

BACKGROUND OF THE INVENTION

1. Field of the Invention

This invention relates to a pressure detection apparatus including two cases, which are fixedly assembled to form a pressure detection chamber, and to a method of manufacturing the same.

2. Description of the Related Art

JP-A-7-243926 proposes a pressure detection apparatus shown in FIG. 9. The pressure detection apparatus has a connector housing J1 as a first housing, and a main housing J2 as a second housing. The connector housing J1 and the main housing J2 are fixedly assembled to form a closed pressure detection chamber J3. An internal pressure of the pressure detection chamber J3 is detected by a pressure sensitive element J4, and is output as a sensor output voltage through a connector pin J5 that is electrically connected to the pressure sensitive element J4.

The two housings J1 and J2 are fixed together by caulking an opening edge portion J2a of the main housing J2 from a position indicated by a two dotted line onto the connector housing J1. Accordingly, the pressure detection chamber J3 sealed by an O-shaped ring J6 is provided. The pressure detection chamber J3 is filled with oil as a pressure transmittance medium.

In the conventional manufacturing method of the pressure detection apparatus as described above, however, it is difficult to crush the O-shaped ring J6 uniformly due to variations in caulking load when the two housings J1 and J2 are caulked, resulting in variations in volume of the pressure detection chamber J3. Because of this, the internal pressure of the pressure detection chamber J3 varies to cause variations in sensor output voltage (for instance, in a range of 30 mV to 40 mV) with respect to a target value. The variations in sensor output voltage appear as variations in output offset, thereby inhibiting improvement of output sensitivity. These adverse effects are especially prominent when a detecting pressure range is low and the sensor output voltage is small.

SUMMARY OF THE INVENTION

The present invention has been made in view of the above problem. A first object of the present invention is to provide a method for manufacturing a pressure detection apparatus by fixing a first case and a second case to decease variations in volume of a pressure detection chamber. A second object of the present invention is to provide a pressure detection apparatus having a structure, which can be manufactured without producing variations in volume of a pressure detection chamber.

According to a first aspect of the present invention, a pressure detection apparatus is manufactured by assembling a first case and a second case to form a pressure detection chamber closed therebetween and to form a space between an outer surface of the first case and an inner surface of the second case, and by filling the space with adhesive made of resin.

According to a second aspect of the present invention, a pressure detection apparatus has a first case, a second case connected to the first case to form a pressure detection chamber, and to define a space between an outer surface of the first case and an inner surface of the second case, and an adhesive filling the space. Accordingly, variations in volume of the pressure detection chamber can be decreased in comparison with a conventional method by caulking, resulting in decreased variations in output.

BRIEF DESCRIPTION OF THE DRAWINGS

Other objects and features of the present invention will become more readily apparent from a better understanding of the preferred embodiments described below with reference to the following drawings, in which.

DETAILED DESCRIPTION OF THE PREFERRED EMBODIMENTS

Figure 1:
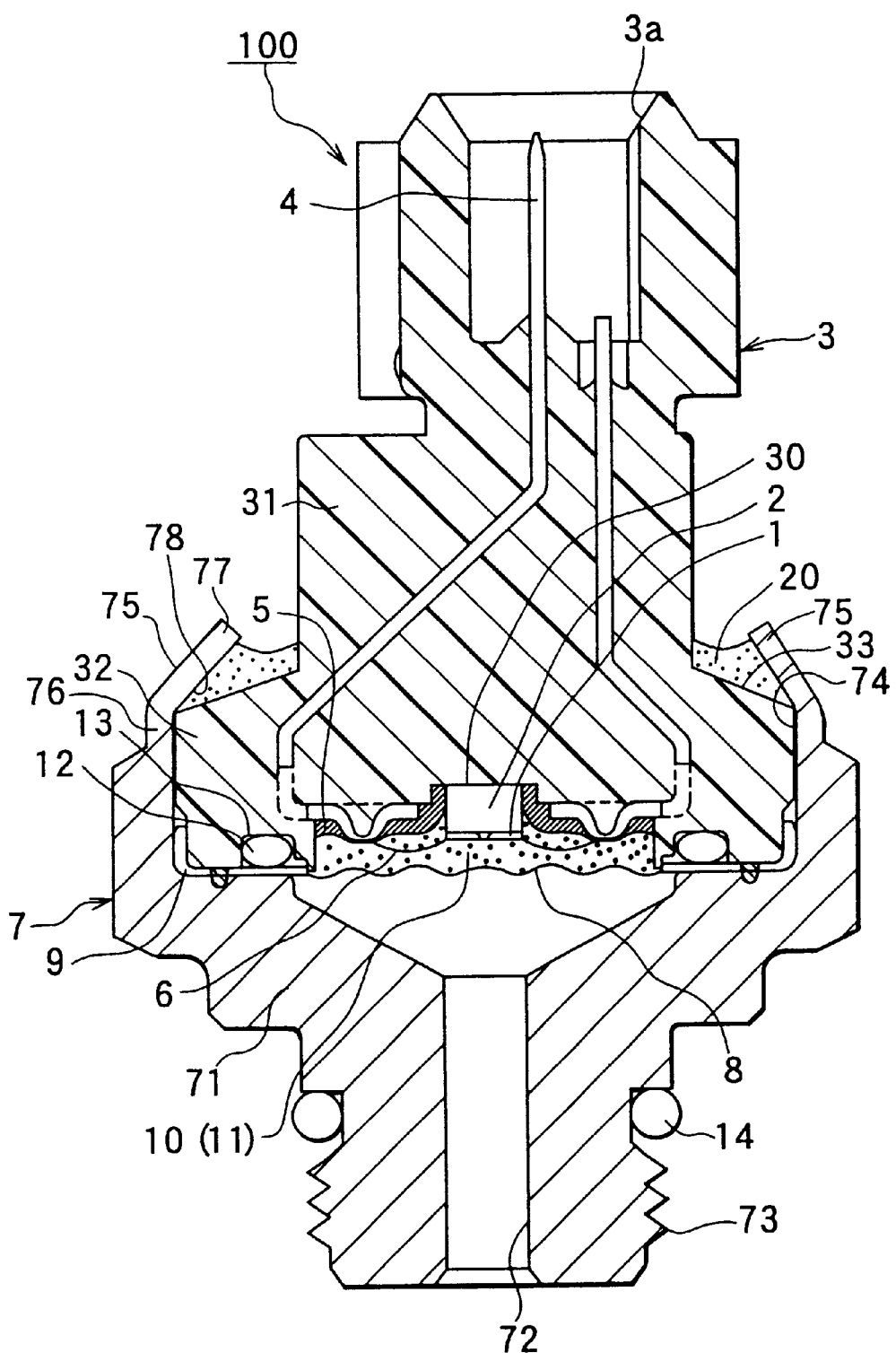
FIG. 1 is across-sectional view showing a pressure detection apparatus in a first preferred embodiment of the present invention.

Hereinafter, referring to FIG. 1, a pressure detection apparatus 100 in a first preferred embodiment is explained. The pressure detection apparatus 100 can be mounted on a vehicle to detect pressure of brake oil, fuel, or the like.

A sensor element (detecting element) 1 is joined to a base 2 made of glass by anodic bonding, and is fixed to a recess portion 30 formed at an end of a case (first case) 3 by adhesive made of silicone rubber or the like. The sensor element 1 detects pressure by converting a pressure signal into an electric signal.

The case 3 is formed from resin such as poly-phenylene sulfide (PPS) by molding, and a connector pin 4 is insert-molded integrally in the case 3 to output the electric signal. The case 3 has at one end side a connector portion 3a for electrically connecting one end of the connector pin 4 to a vehicular external circuit such as an ECU via an external wiring member (not shown) such as a wire harness. The other end of the connector pin 4 is sealed with a surface-sealing compound 5 such as silicone rubber in the recess portion 30 of the case 3. The other end of the connector pin 4 is electrically connected to the sensor element 1 via a bonding wire 6 by wire bonding or the like. Accordingly, the electric signal is transmitted to the external circuit from the sensor element 1 through the bonding wire 6 and the connector pin 4.

A housing (second case) 7 has a housing body 71. The housing body 71 is made of steel material (for instance, plated carbon steel) or the like, and has a pressure conduction hole 72 for conducting pressure (detection pressure) to be measured and a screw part 73 for fixing the apparatus to an appropriate position. Further, a thin seal diaphragm 8 and a press member (ring weld) 9 are hermetically joined to the housing body 71 at an entire circumference thereof by welding at the end of the pressure conduction hole 72. The diaphragm 8 and the press member 9 are made of metal such as SUS.

The fixation structure between the case 3 and the housing 7 assembled together is explained in more detail. As shown in FIG. 1, the case 3 has a case body 31 having a generally cylindrical shape with the recess portion 30. The sensor element 1 and the connector pin 4 are accommodated in the case body 31. The case body 31 has a generally cylindrical protruding portion (step portion, end portion) 32 protruding outwardly in a radial direction at an entire circumference thereof. The housing body 71 has an opening portion (recess portion) 74 at a connection side to the case 3.

The protruding portion 32 of the case 3 is closely inserted into the opening portion 74 so that an opening edge portion (connecting portion, opening wall portion) 75 of the opening portion 74 overlaps with the protruding portion 32. Then, the opening edge portion 75 is bent and caught on the side surface 33 of the protruding portion 32. That is, the opening edge portion 75 of the housing 7 is formed to be free and is bent to cover the protruding portion 32 of the case 3. The opening edge portion 75 has an abutting portion 76 for abutting the case 3 to prevent the detachment of the housing 7 from the case 3, and an end (front end) portion 77 extending from the abutting portion 76 toward a front end of the opening edge portion 75 and positioned apart from the case 3.

A space defined by the side surface 33 of the protruding portion 32 and the opening edge portion 75 is filled with adhesive 20 made of setting resin such as epoxy resin. The adhesive 20 contacts both the side surface 33 of the protruding portion 32 and an end portion inner surface 78 of the opening edge portion 75, thereby bonding both the portions 32 and 75 together. Accordingly, the case 3 and the housing 7 are fixedly assembled with each other, and a pressure detection chamber 10 is provided between the recess portion 30 of the case 3 and the seal diaphragm 8 of the housing 7. The pressure detection chamber 10 is filled with oil 11 serving as a sealing liquid and as a pressure transmittance medium.

An O-shaped ring 12 is disposed in an annular groove 13, which is provided at the end surface of the case 3 at the outer circumference portion of the pressure detection chamber 10, to hermetically seal the pressure detection chamber 10. The O-shaped ring 12 accommodated in the groove 13 is pressed by the case 3 and the press member 9 of the housing 7 from the both sides thereof, and accordingly is crushed.

Thus, in the pressure detection apparatus 100 of the present embodiment, the housing 7 is fixed to the case 3 to cover a part of the case 3, and to form the pressure detection chamber 10. The seal diaphragm 8 and the O-shaped ring 12 hermetically seal the pressure detection chamber 10. Not the housing 7 but the case 3 may have the seal diaphragm 8. The sensor element 1 accommodated in the sealed pressure detection chamber 10 detects pressure within the pressure detection chamber 10 and outputs the detected pressure as an output. The operation of this detection is explained in more detail below.

The pressure detection apparatus 100 is, for instance, attached to an appropriate position of a vehicular brake oil pipe system to communicate with the pipe system by the screw part 73 of the housing 7 and an O-shaped ring 14 attached to the screw part 73. Then, oil pressure in the pipe system is introduced into the apparatus 100 through the pressure conduction hole 72 of the housing 7. The oil pressure is transmitted to the sensor element 1 through the seal diaphragm 8 and the oil 11 filling the pressure detection chamber 10. The sensor element 1 receives pressure corresponding to the oil pressure, and converts the pressure into an electric signal (output voltage). The electric signal is then transmitted from the sensor element 1 to the external circuit via the bonding wire 6 and the connector pin 4. As a result, the oil pressure of brake oil can be detected.

Next, a manufacturing method of the pressure detection apparatus 100 is explained below referring to FIGS. 2 to 6, each of which shows a cross-section corresponding to that in FIG. 1 at each step. First, the case 3 is molded from thermoplastic resin such as PPS with the connector pin 4 inserted therein by using several divided molding dies. The base 2 and the sensor element 1 are disposed in the recess portion 30 of the molded case 3. After the sensor element 1 is connected to the connector pin 4 by the bonding wire 6, the O-shaped ring 12 is disposed in the groove 13, thereby forming a first sub-assembly shown in FIG. 2A. This is a first step.

Figure 2A:
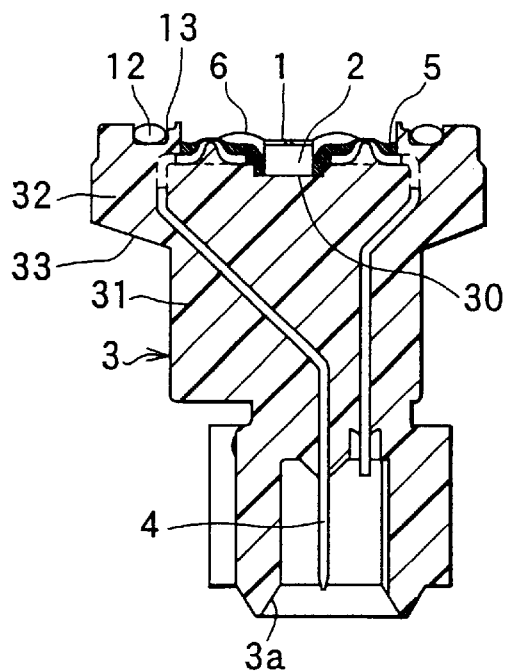
FIGS. 2A to 2C are cross-sectional views showing steps for manufacturing the pressure detection apparatus in FIG. 1.
Figure 2B:
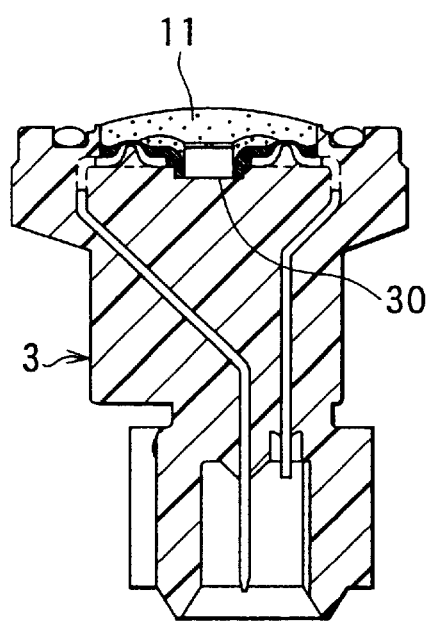
Figure 2C:
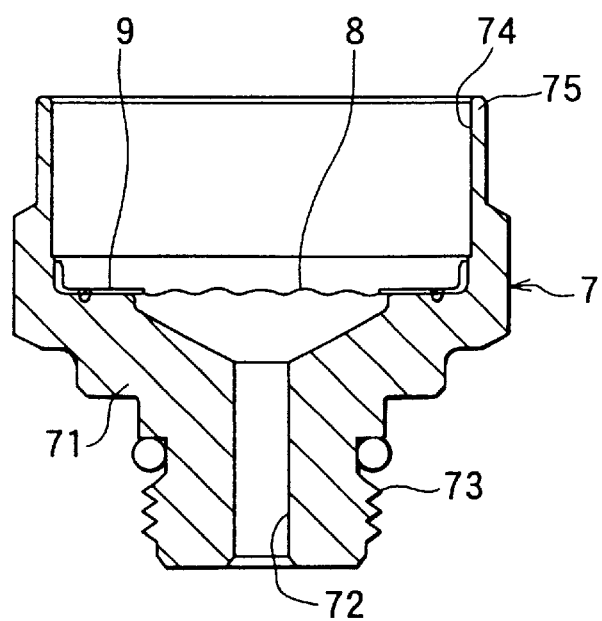

Next, as shown in FIG. 2B, at a second step, the first sub-assembly is positioned to have the sensor element 1 at an upside thereof, and a specific amount of the oil 11 such as fluorine oil is injected into the recess portion (oil chamber) 30 of the case 3 from the upper side by using a dispenser or the like. Further, at a third step, as shown in FIG. 2C, the housing 7 in which the seal diaphragm 8 and the press member 9 are hermetically welded to the entire peripheral portion of the end of the pressure conduction hole 72 is prepared as a second sub-assembly.

Figure 3:
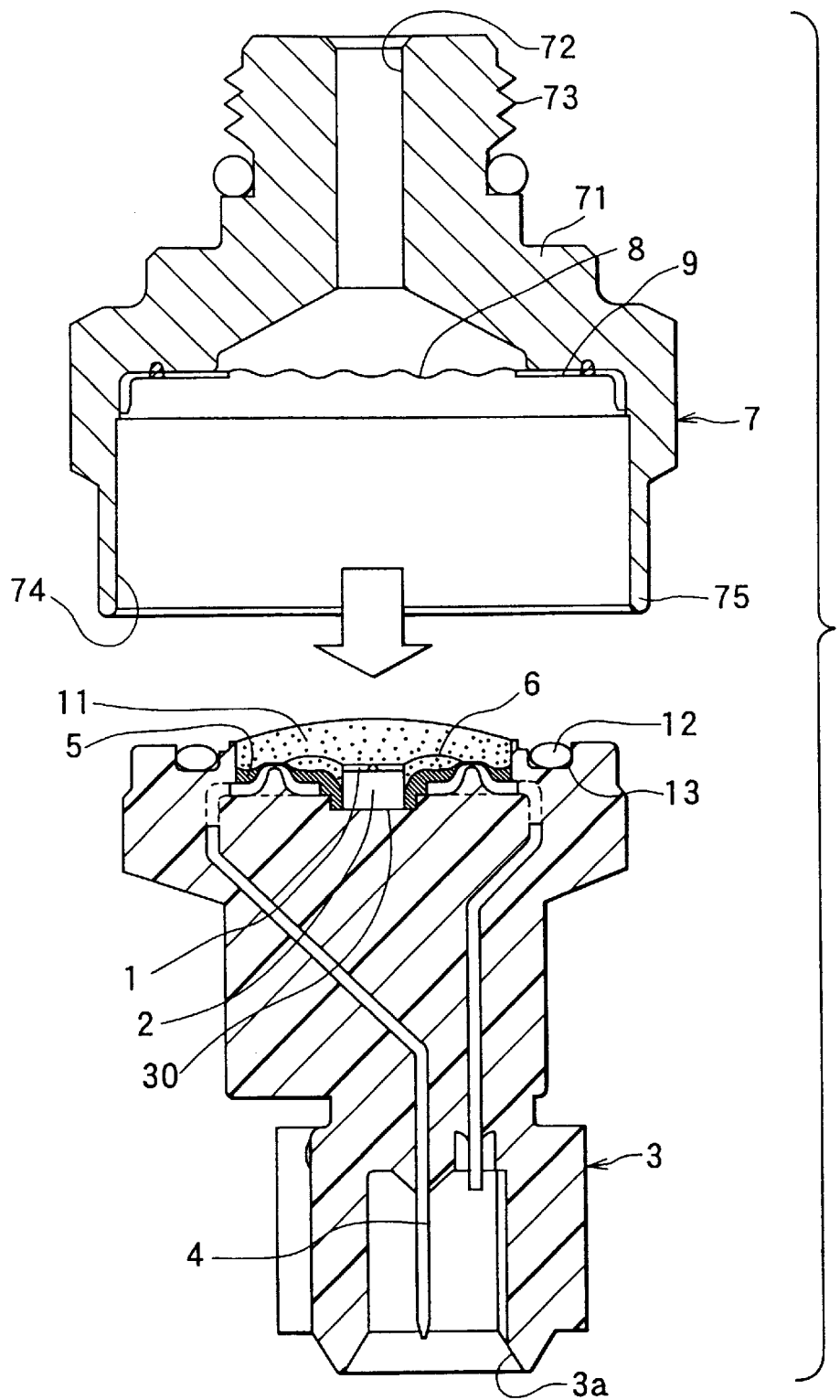
FIGS. 3 to 6 are cross-sectional views showing steps for manufacturing the pressure detection apparatus, following the steps shown in FIGS. 2A to 2C.

At a fourth step, the first sub-assembly is fitted into the second sub-assembly to form the closed pressure detection chamber 10. Specifically, as shown in FIG. 3, the second sub-assembly composed of the housing 7 is descended while being kept horizontally to fit the case 3 constituting the first sub-assembly. Then, the assembled first and second sub-assemblies are put into a vacuum chamber so that extra air is completely removed from the pressure detection chamber 10 under vacuum. After that, the case 3 and the housing 7 are pushed against each other so that the press member 9 contacts the case 3 sufficiently. Accordingly, the pressure detection chamber 10 is hermetically sealed by the O-shaped ring 12. In this step, the case 3 and the housing 7 are fixedly assembled with each other via the O-shaped ring 12, and the pressure detection chamber 10 is sealed by the O-shaped ring 12 and the seal diaphragm 8.

Figure 4:
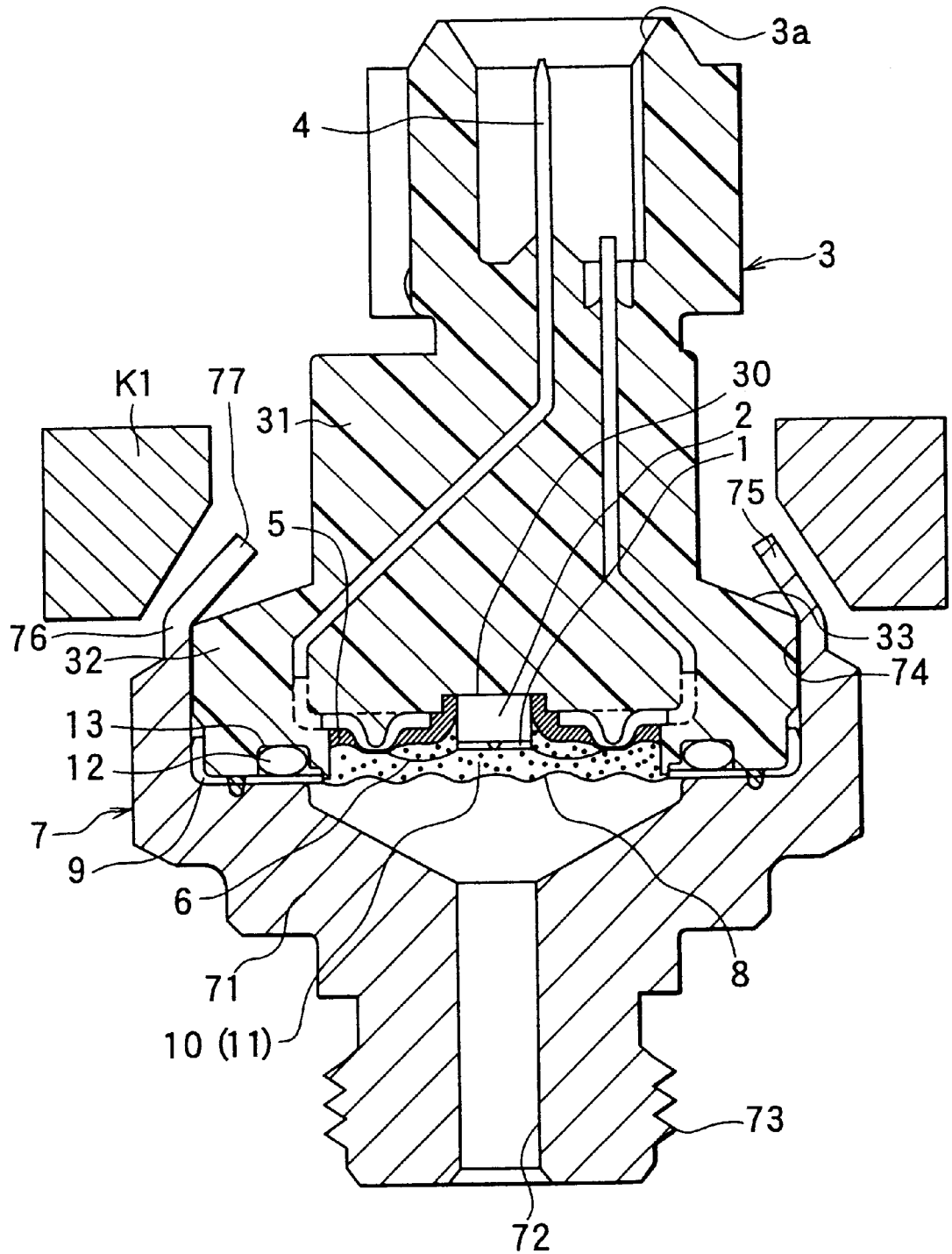

After the fourth step is performed to form the sealed pressure detection chamber 10, the integrated first and second sub-assemblies are taken out of the vacuum chamber. Then, as shown in FIG. 4, at a fifth step, the assemblies are positioned upside down, and a caulking load (for instance, 1 ton) is applied to the opening edge portion 75 of the housing by a caulking jig K1. Accordingly, the opening edge portion 75 is bent to a position shown in FIG. 4 so that it is caught on the side surface 33 of the protruding portion 32.

That is, at the fifth step, the opening edge portion 75 as an end of the second case is caulked to cover the protruding portion 32 of the case (first case) 3. By this caulking, a part of the opening edge portion 75 abuts the case 3 as the abutting portion 76 to prevent the detachment of the housing 7 from the case 3, and a remaining part of the opening edge portion 75 extends as the end portion 77 from the abutting portion 76 to separate from the case 3. Accordingly, the opening edge portion 75 composed of the abutting portion 76 and the end portion 77 is formed to provisionally fix the two cases 3 and 7 together.

Figure 5:
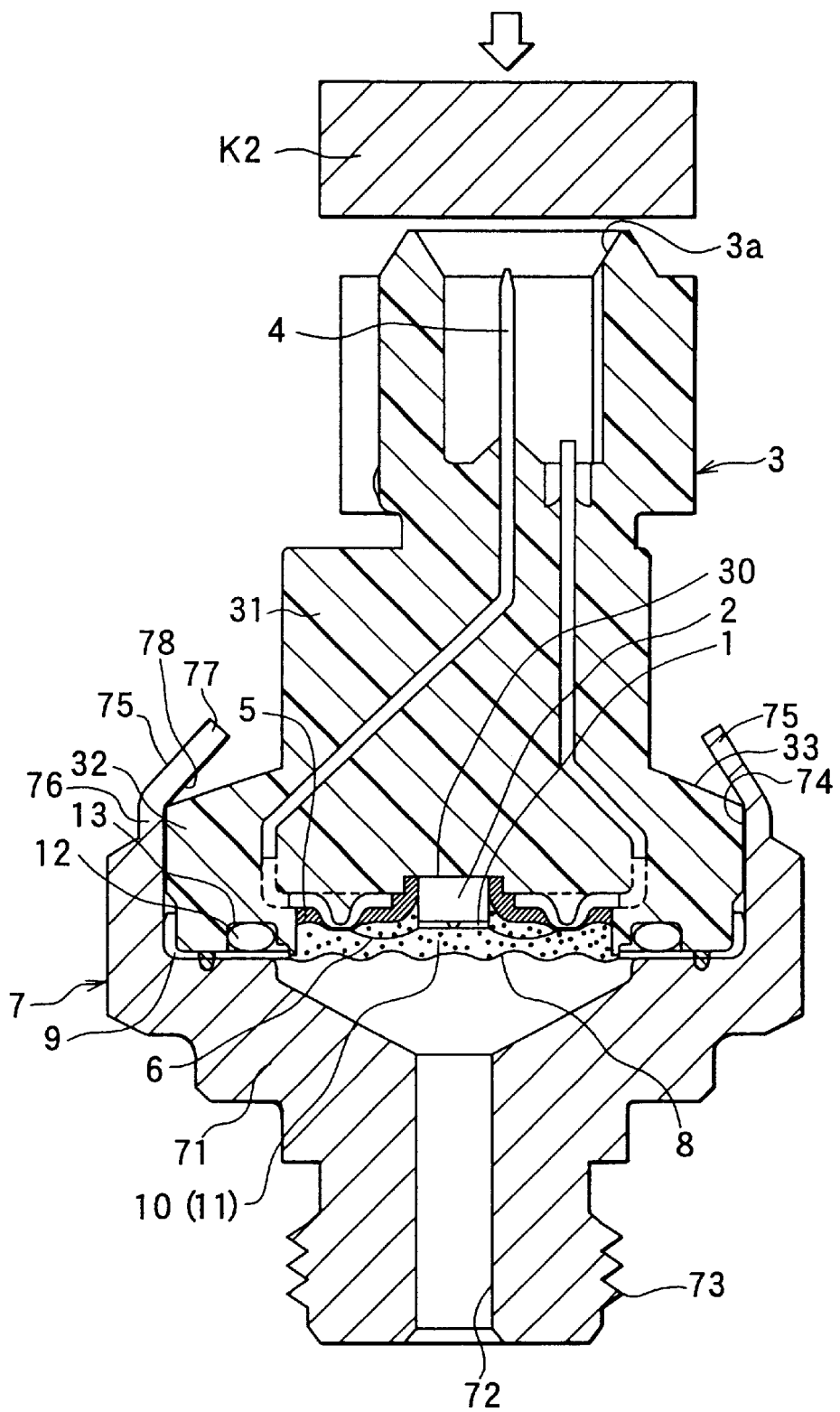

Next, as shown in FIG. 5, at a sixth step, a jig K2 is positioned above the end surface of the connector portion 3a, and load is applied to the case 3 from the upper surface of the jig K2. The assembled state between the case 3 and the housing 7 is adjusted under the load applied thereto form the jig K2, while monitoring an electric signal outputted from the sensor element 1 via the connector pin 4 by a digital multi-meter (not shown) or the like simultaneously. When the monitored output is a specific value (for instance, a voltage of 0.5 V), the load is fixed.

At this sixth step, atmospheric pressure is conducted into the pressure detection chamber 10 through the pressure conduction hole 72. The sensor element 1 detects the atmospheric pressure and outputs an electric signal (output signal) to be monitored. The jig K2 is not limited to a special one, but may be various kinds of jigs such as a vice or a jig capable of applying load by thread fastening.

Figure 6:
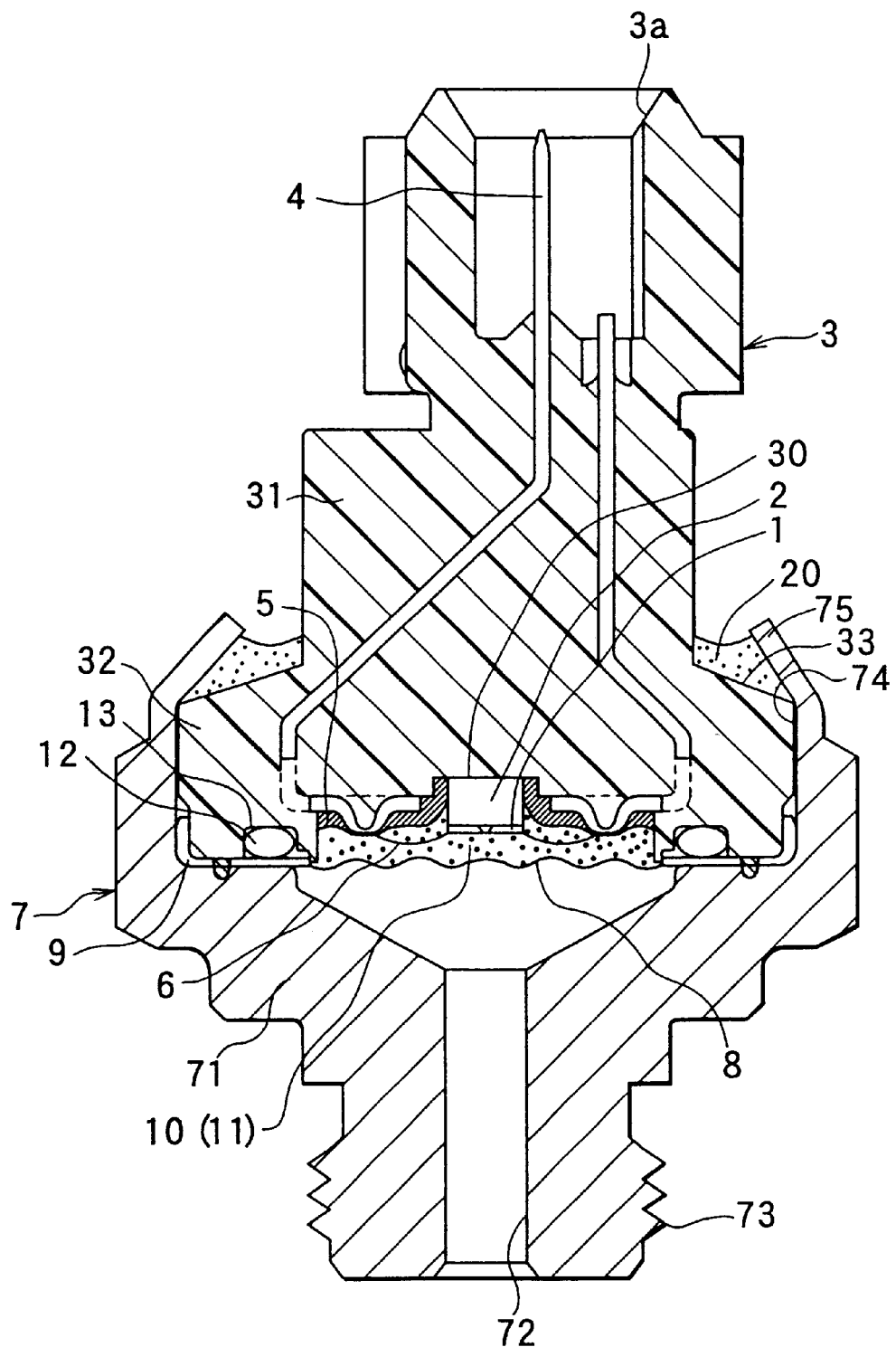

Next, at a seventh step, as shown in FIG. 6, the adhesive (potting resin) 20 is injected into the space defined between the protruding portion 32 of the case 3 and the opening edge portion 75 of the housing 7. At that time, the adhesive 20 is at a state before setting, but does not invade the pressure detection chamber 10, since the O-shaped ring 12 seals the pressure detection chamber 10 securely. The adhesive 20 can be made of thermosetting resin such as epoxy resin, phenol resin, or the like, or resin that is set at an ordinal temperature. The seventh step may be performed between the fifth and sixth steps. In this case, the sixth step must be performed in a sate where the adhesive 20 is not hardened.

After that, at an eighth step, the adhesive 20 is hardened (set) while adjusting the load applied from the jig K2 so that the monitored output is kept at the specific value described above. For instance, when the adhesive 20 is made of epoxy resin, the adhesive 20 is hardened approximately at 150° C. for 1 hour. In this embodiment, the setting of the adhesive 20 can control the crushed state of the O-shaped ring 12. After the adhesive 20 is hardened to fix the case 3 and the housing 7 to each other, at a ninth step, the load imparted from the jig K2 is released. Accordingly, the case 3 and the housing 7 are fixedly assembled with each other, thereby completing the pressure detection apparatus 100 having the sealed pressure detection chamber 10.

Thus, according to the manufacturing method of the present embodiment, at the fourth step, the closed pressure detection chamber 10 accommodating the sensor element 1 therein is formed by assembling the case 3 and the housing 7 so that the protruding portion 32 and the opening edge portion 75 overlap with each other, and at the sixth step, the assembled state of the case 3 and the housing 7 is adjusted so that the output from the sensor element 1 is kept at the specific value while monitoring the output. Further, at the seventh step, the space defined by the cases 3 and 7 overlapping with each other is filled with the adhesive 20 made of setting resin, and at the eighth step, the adhesive 20 is hardened while maintaining the state where the monitored output from the sensor element 1 is kept at the specific value.

The secure fixation between the case 3 and the housing 7 is achieved by the resin adhesive 20, and is not accompanied by a pushing force as in a conventional method performed by caulking. The pressure detection chamber 10 has no variations in volume when it is formed, resulting in decreased variations in output (electrical signal). Further, the abutting portion 76 of the opening edge portion 75 prevents the housing 7 from being detached from the case 3, and the adhesive 20 fixes the housing 7 to the case 3. Consequently, the assembled state is stable as compared to that in the conventional method using caulking.

In the manufacturing method described above, even when the adhesive 20 is hardened without monitoring the output from the pressure detection chamber 10, the variations in output can be decreased as compared to that in the conventional method. However, monitoring the output as described above can further reduce the variations in output and provide high accuracy. In addition, in the manufacturing method described above, at the fifth step, the opening edge portion 75 of the housing 7 is bent to be caught on the side surface 33 of the protruding portion 32 at the overlapping portions (connecting portions) of the case 3 and the housing 7. This further strengthens the fixation between the case 3 and the housing 7.

Figure 7:
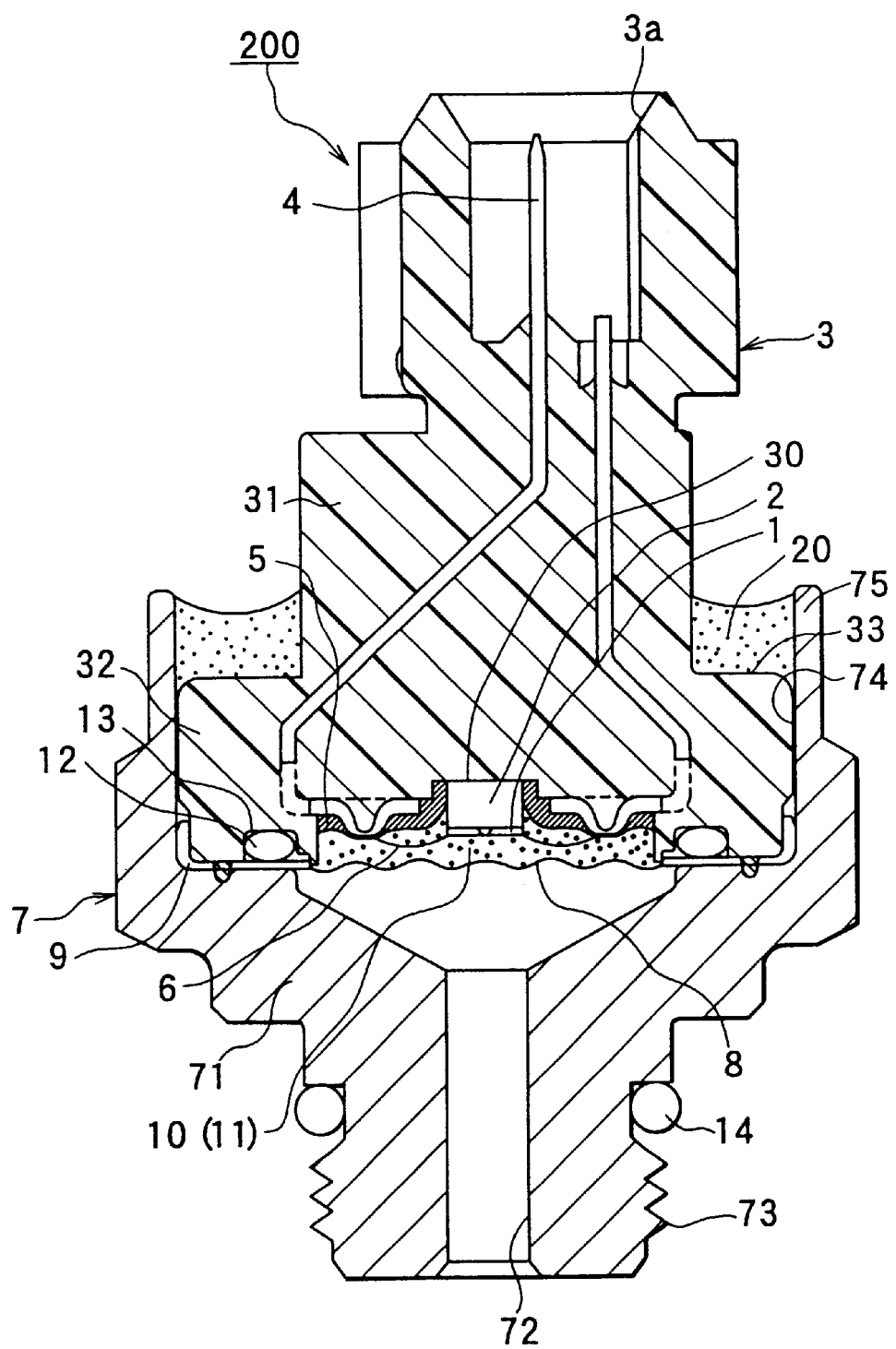
FIG. 7 is across-sectional view showing a pressure detection apparatus in a modified embodiment of the present invention.

Incidentally, it is not always necessary to perform the fifth step to achieve the objects of the present invention. FIG. 7 shows a modified embodiment of a pressure detection apparatus 200 manufactured without performing the fifth step. In the pressure detection apparatus 200, the opening edge portion 75 of the housing 7 extends straightly without being bent, and the adhesive 20 fills a space defined by the straight opening edge portion 75 and the case 3.

In the embodiment described above, the protruding portion 32 of the case is fitted into the opening portion 74 of the housing 7. However, the case 3 may have an opening portion into which a part of the housing 7 can be inserted to form overlapping portions (connecting portions) between the case 3 and the housing 7. The adhesive 20 can fill a space defined between the overlapping portions as well. In this case, a part of the case 3 may be bent to be caught on the housing 7 at the overlapping portions.

Figure 8:
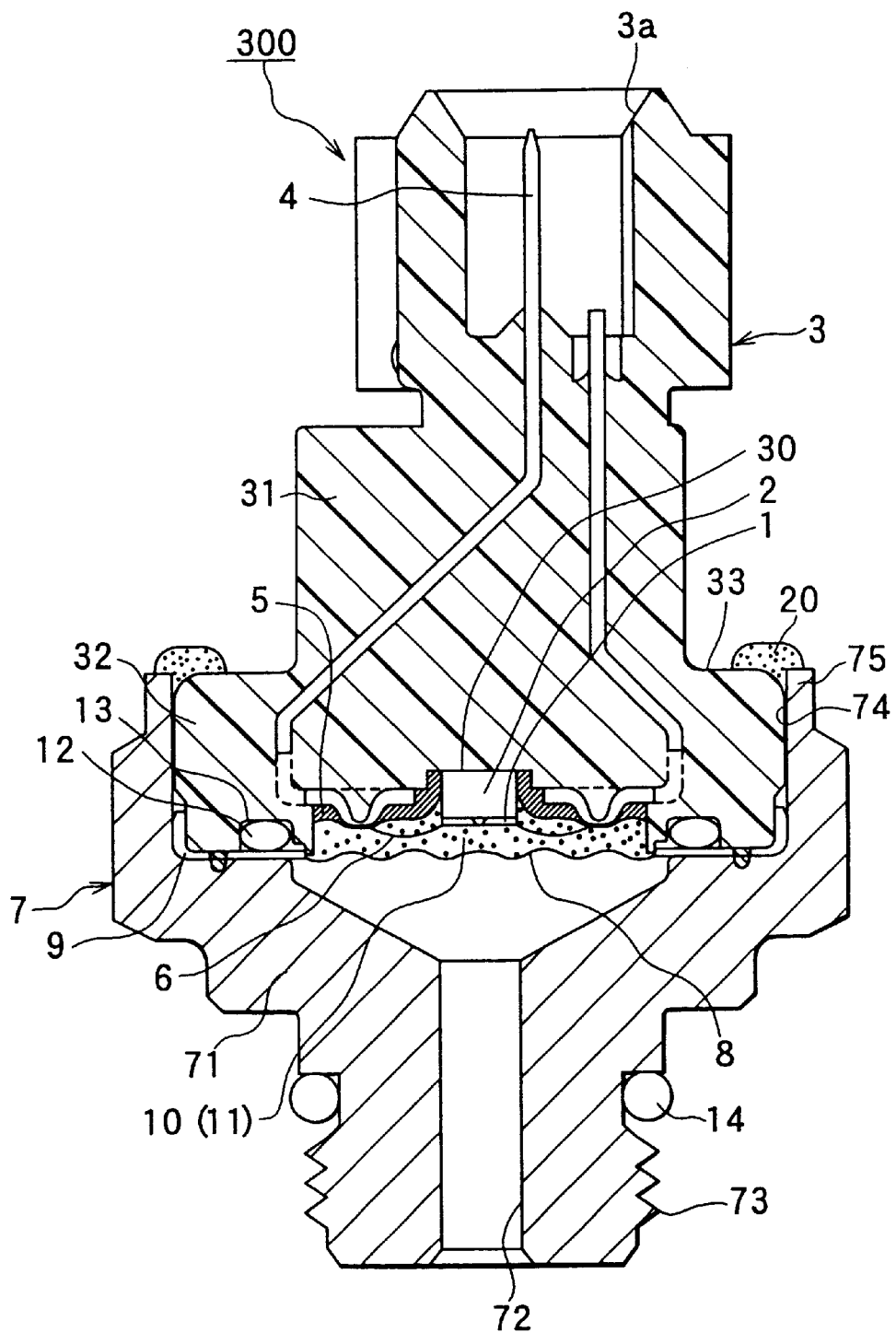
FIG. 8 is across-sectional view showing a pressure detection apparatus in another modified embodiment of the present invention.
Figure 9:
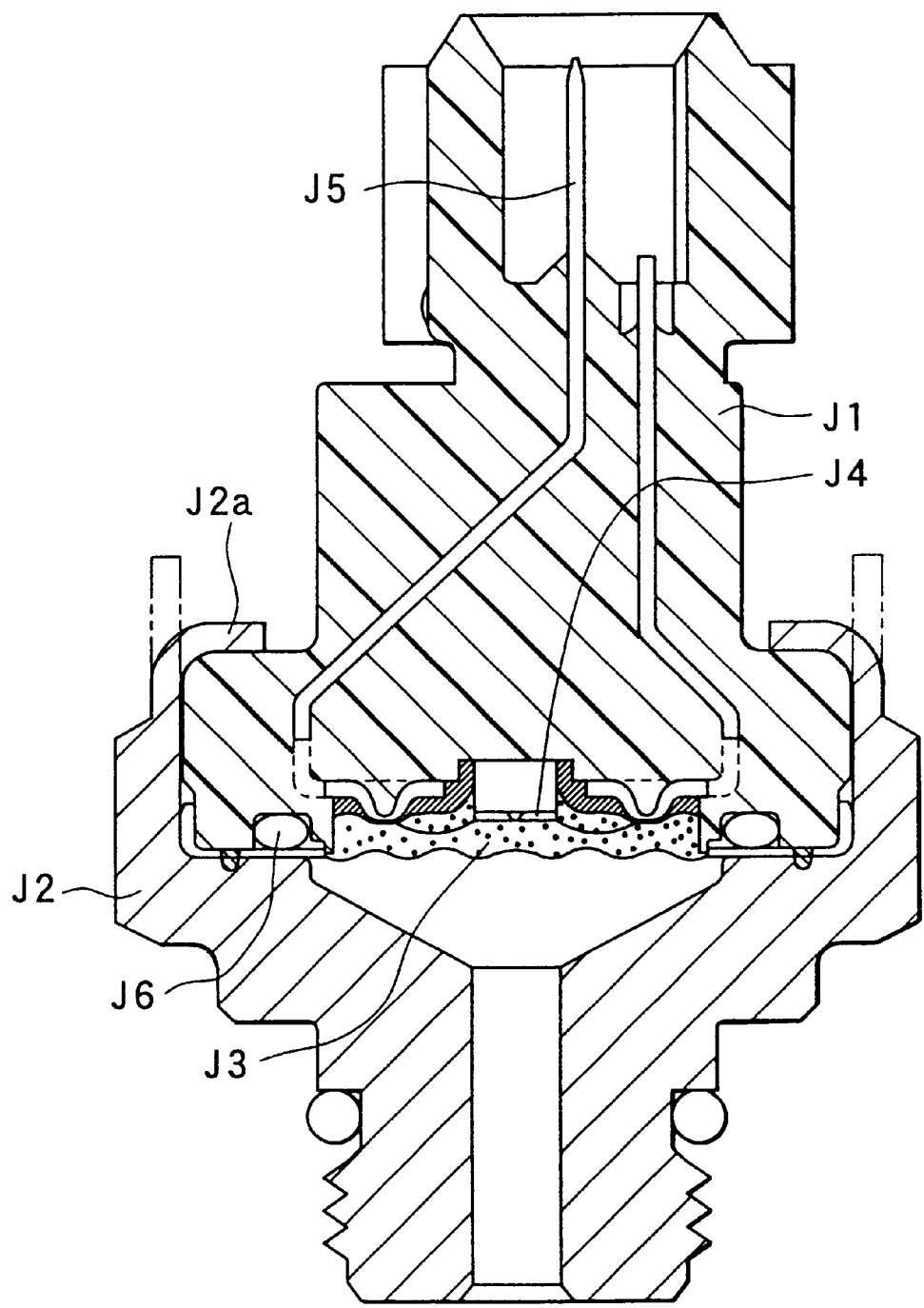
FIG. 9 is a cross-sectional view showing a conventional pressure detection apparatus.

In each of the pressure detection apparatuses 100, 200 shown in FIGS. 1 and 7, the space defined by the opening edge portion 75 of the housing 7 and the case 3 is filled with the adhesive 20. However, the adhesive 20 may not be disposed in the space (gap) between the overlapping portions (connecting portions). For instance, as in a pressure detection apparatus 300 shown in FIG. 8, the adhesive 20 may be disposed on end portions of the overlapping portions of the case 3 and the housing 7 across both the end portions. That is, the adhesive 20 contacts both the case 3 and the housing 7 to securely fix them. The opening edge portion 75 abuts the protruding portion 32 at an approximately entire inner surface thereof without being bent.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A method for manufacturing a pressure detection apparatus, comprising:
   assembling a first case and a second case to form a pressure detection chamber closed there between, and to form a space between an outer surface of the first case and an inner surface of the second case, wherein the space is outside of the pressure detection chamber; and
   disposing an adhesive made of resin in the space to fix the first case and the second case together in such a manner that the adhesive contacts both the first case and the second case.

2. The method of claim 1, wherein one of the first case and the second case has a sensor element for detecting a pressure in the pressure detection chamber.

3. The method of claim 2, wherein the first case and the second case are fixed to each other by the adhesive while controlling an output outputted from the sensor element to be a specific value.

4. The method of claim 1, wherein:
the first case has a step portion; and
said assembling of the first case and the second case includes;
fitting the first case and the second case; and
bending an end portion of the second case so that the end portion is caught on the step portion.

5. The method of claim 1, wherein the adhesive is made of setting resin.

6. The method of claim 1, wherein:
first one of the first case and the second case has a seal diaphragm at a side connected to second one of the first case and the second case; and
the first case and the second case are assembled through an O-shaped ring intervening therebetween to form the pressure detection chamber that is sealed by the seal diaphragm and the O-shaped ring.

7. The method of claim 1, wherein said assembling of the first case and the second case includes:
fitting the first case and the second case so that the second case has an end portion that is composed of an abutting portion abutting the outer surface of the first case and a front end portion extending from the abutting portion to separate from the first case; and
caulking the front end portion toward the first case, whereby the space is formed by the inner surface of the front end portion of the second case and the outer surface of the first case.

8. A pressure detection apparatus comprising:
a first case;
a second case connected to the first case to form a pressure detection chamber closed between the first case and the second case, and defining a space between an inner surface of the second case and an outer surface of the first case, wherein the space is outside of the pressure detection chamber; and
an adhesive disposed in the space and fixing the first case and the second case together in such a manner that the adhesive contacts both the first case and the second case.

9. The pressure detection apparatus of claim 8, wherein:
the second case has a free end portion covering a part of the first case, the free end portion having an abutting portion abutting the outer surface of the first case and a front end portion extending from the abutting portion to separate from the first case; and
the space filled with the adhesive is defined between the inner surface of the front end portion of the second case and the outer surface of the first case.

10. The pressure detection apparatus of claim 8, further comprising an O-shaped ring disposed between the first case and the second case, wherein:
one of the first case and the second case has a seal diaphragm; and
the pressure detection chamber is sealed by the O-shaped ring and the seal diaphragm.

11. A pressure detection apparatus comprising:
a case having a pressure conduction hole; and
a sensor element disposed in the case for detecting a pressure introduced thereto through the pressure conduction hole, wherein:
the case is composed of a first case having a generally cylindrical portion, and a second case having an opening portion surrounded by an opening wall portion;
the cylindrical portion of the first case is disposed in the opening portion of the second case with an outer cylindrical surface thereof directly contacting an inner surface of the opening wall portion; and
an adhesive is disposed to contact both the cylindrical portion of the first case and the opening wall portion of the second case to fix the first case and the second case together.

12. The pressure detection apparatus of claim 11, wherein:
the first case is made of resin; and
the second case is made of metal.

13. The pressure detection apparatus of claim 11, wherein:
the opening wall portion has an abutting portion directly contacting the cylindrical portion of the first case and a front end portion extending from the abutting portion to define a space between an inner surface thereof and an outer surface of the cylindrical portion; and
the adhesive fills the space.

14. The pressure detection apparatus of claim 11, wherein the opening wall portion of the second case extends straightly.

15. The pressure detection apparatus of claim 14, wherein the cylindrical portion has a length in an axial direction thereof, the length being approximately equal to that of the opening wall portion.

16. The pressure detection apparatus of claim 14, wherein:
the opening wall portion has an abutting portion directly contacting the cylindrical portion of the first case, and a front end portion extending from the abutting portion straightly, the front end portion protruding from the cylindrical portion to define the space with the cylindrical portion.

* * * * *